United States Patent [19]

Fisher

[11] Patent Number: 4,940,927

[45] Date of Patent: Jul. 10, 1990

[54] THREE-PHASE A-C SPEED CONTROL FOR VARIABLE TORQUE MOTOR

[75] Inventor: Marvin J. Fisher, St. Louis, Mo.

[73] Assignee: Century Electric, Inc., St. Louis, Mo.

[21] Appl. No.: 770,719

[22] Filed: Aug. 29, 1985

[51] Int. Cl.$^5$ ............................................. H02P 5/40
[52] U.S. Cl. .................................................. 318/809
[58] Field of Search ...................... 318/809; 331/1 A; 324/83 D

[56] References Cited

U.S. PATENT DOCUMENTS

| | | | |
|---|---|---|---|
| 3,344,326 | 9/1967 | Risberg | 318/798 |
| 3,368,133 | 2/1968 | Zenner . | |
| 3,467,904 | 9/1969 | Studtmann et al. . | |
| 3,527,990 | 9/1970 | Gasser . | |
| 3,560,834 | 2/1971 | Studtmann . | |
| 3,577,052 | 5/1971 | Bauer . | |
| 3,611,089 | 10/1971 | Mokrytzki et al. . | |
| 3,621,352 | 11/1971 | Dinger . | |
| 3,662,247 | 5/1972 | Schieman . | |
| 3,665,273 | 5/1972 | Enslin | 318/809 |
| 3,701,001 | 10/1972 | Riess et al. . | |
| 3,704,403 | 11/1972 | Gillett . | |
| 3,819,992 | 6/1974 | Opal et al. . | |
| 3,864,618 | 2/1975 | Hammond . | |
| 3,886,430 | 5/1975 | Meier . | |
| 4,042,862 | 8/1977 | Franklin . | |
| 4,146,836 | 3/1979 | Zimmer | 324/79 D |
| 4,211,967 | 7/1980 | Akiyama et al. | 318/314 |
| 4,286,203 | 8/1981 | Ehret . | |
| 4,295,085 | 10/1981 | Lafuze . | |
| 4,348,627 | 9/1982 | Fulton . | |
| 4,387,329 | 6/1983 | Harlow | 318/809 |
| 4,409,533 | 10/1983 | Kawabata . | |
| 4,409,535 | 10/1983 | Hickman . | |
| 4,437,051 | 3/1984 | Muto et al. . | |
| 4,441,063 | 4/1984 | Roof et al. . | |
| 4,459,533 | 7/1984 | Ehret et al. . | |
| 4,484,129 | 11/1984 | Ono . | |
| 4,527,109 | 7/1985 | Hosokawa et al. . | |

FOREIGN PATENT DOCUMENTS 055856  7/1982  European Pat. Off. ............ 323/205

OTHER PUBLICATIONS

Kenly et al, "Triac Speed Control of Three-Phase Induction Motor with Phase-Locked Loop Regulation", IEEE Transactions on Industry Applications, vol. IA, No. 5, Sep. 4, 1976, pp. 492-498.

Moffat et al, "Digital Phase-Locked Loop for Induction Motor Speed Control", IEEE Transactions on Industry Applications, vol. IA15, No. 2, Mar./Apr. 1979, pp. 176-182.

Primary Examiner—David Smith, Jr.
Attorney, Agent, or Firm—Rogers, Howell & Haferkamp

[57] ABSTRACT

A three-phase A-C speed controller for small integral and fractional horsepower motors includes a phase locked loop comprised principally of a phase comparator and voltage controlled oscillator to generate phase delayed trigger signals for energizing the windings of a three-phase A-C motor. A pair of shift registers are cascaded with a flip-flop to generate the 60° phase delay between phases as is necessary in a three-phase system.

22 Claims, 2 Drawing Sheets

FIG. I.

THREE-PHASE A-C SPEED CONTROL FOR VARIABLE TORQUE MOTOR

BACKGROUND AND SUMMARY

Single-phase A-C variable speed controls for fractional and small integral horsepower motors are widely available in the prior art, and there are many designs for these controllers to achieve the variable speed control in this range of motor size. However, there are many applications which include a number of three-phase A-C motors and in which it would be desirable to provide variable speed control for a motor of the same range, except in three-phase. One such example is in a condenser for a large air conditioning installation in which there is one fan motor which is utilized to cool the condenser coils during the off season, that motor being of the same size as the other three-phase A-C motors used in the hot season as a greatly reduced amount of air flow is required and desired to maintain the condenser temperature at its optimum for efficient system operation. Generally, in those applications a small single-phase A-C motor and variable speed control is provided as there are few three-phase A-C variable speed controllers which are economically feasible for that application. As can be appreciated by one of ordinary skill in the art, it is much more desirable to utilize a three-phase motor and control in such an application as it simplifies the design of the system, eliminates the equipment necessary to convert three-phase to single-phase, and also utilizes three-phase motors throughout the system which can significantly reduce the inventory of motors required to manufacture and sell systems of this design.

To solve these and other problems, the inventor herein has succeeded in designing and developing a three-phase A-C speed control for variable torque motor applications in the small integral and fractional horsepower range. These applications include fan motors, pumps, blowers, and other applications in which the motor can operate through a wide slip range. The controller of the present invention provides approximately six-to-one speed control, and has many unique features which simplify the design, and which uniquely generate and synchronize the trigger signals utilized in switching on the three motor windings in proper sequence and phase delay. The speed control of the present invention includes at its heart a phase locked loop including a phase comparator which compares the phase delay between a single phase 60 Hz. reference signal and a feedback signal from a voltage controlled oscillator circuit operating at 5760 Hz. whose output is reduced to 60 Hz. by a two-stage divider circuit. The speed control signal is injected into a low pass filter which connects the phase comparator with the voltage controlled oscillator so that as the desired speed is changed, the phase of the feedback signal generated by the voltage controlled oscillator is changed, and the output of the phase comparator is changed accordingly. A D-type flip-flop is connected to the output of the phase comparator, and is clocked by the 5760 Hz. generated by the voltage controlled oscillator to produce a stream of pulses at 120 Hz. having a delay corresponding to the phase delay between the 60 Hz. feedback signal and the 60 Hz. reference signal. This 120 Hz. pulse stream is used to trigger a first winding of the three motor windings. This first pulse train is also input to a pair of 16 bit shift registers which are connected in cascade which, because of the VCO frequency, provide a 60° delay between their outputs which are also 120 Hz. pulse trains. An electronic switching circuit comprised of logic gates and triacs, and their associated isolation circuitry are utilized to switch A-C power to the motor windings.

As the speed controller is comprised of electronic components, it can be mounted to a PC board with suitable heat sinking and be packaged for connection to the three motor leads, the three A-C voltage leads, and two input leads for the control signal. This controller will thus provide variable speed control with a small three-phase A-C motor. The principal advantages and features of this invention have been mentioned above. However, a greater understanding of the invention and a fuller appreciation of the full range of features provided by this invention can be achieved by referring to the drawings and Detailed Description of the Preferred Embodiment which follows.

DETAILED DESCRIPTION OF THE PREFERRED EMBODIMENT

Figure 1:
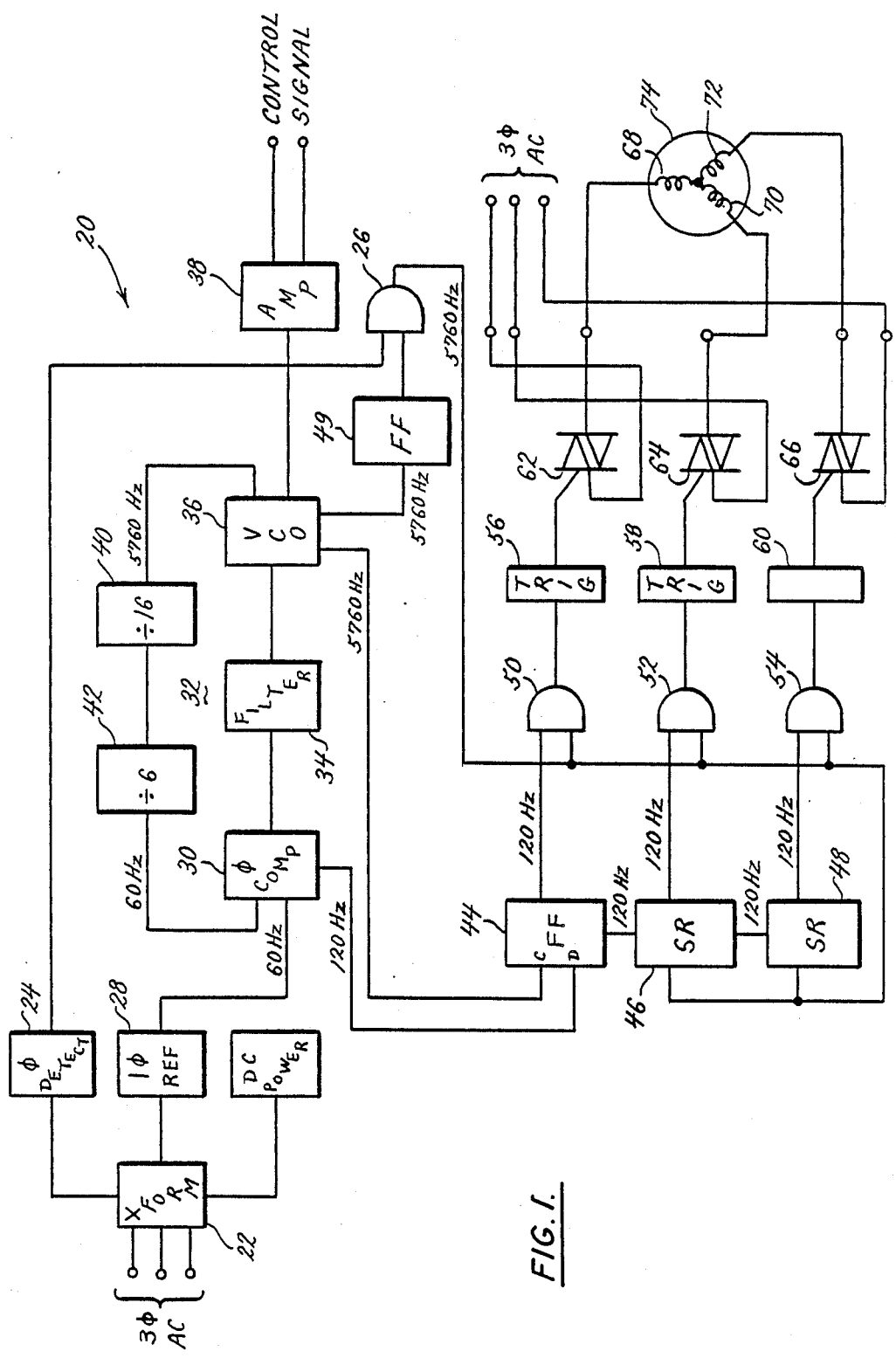
FIG. 1 is a block diagram of the speed control of the present invention.

A block diagram of the speed controller 20 is shown in FIG. 1 and will be described for purposes of clarity on an overall basis. The principal elements of the speed controller 20 include an incoming transformer 22 which is connected to a three-phase A-C power supply for transforming the three-phase A-C into two-phase for the phase detector 24. Phase detector 24 determines whether the three phases are connected in proper sequence, and if so enables the AND gate 26. A single phase A-C reference circuit 28 produces the 60 cycle square wave reference for phase comparator 30 in the phase-locked loop 32. The output of phase comparator 30 is filtered by low pass filter 34 and input to a voltage controlled oscillator 36 which produces 5760 Hz. square wave. A control signal is input through amplifier 38 to voltage controlled oscillator 36, and its effect is to shift the phase of the output thereof. A divide-by-sixteen circuit 40 and a divide-by-six circuit 42 transform the 5760 Hz. square wave to 60 Hz. square wave for input to phase comparator 30. Therefore, phase comparator 30 senses the phase difference between the 60 Hz. square wave reference voltage produced by single phase reference 28 and the feedback signal produced by VCO 36 along with divider circuits 40, 42. This results in a 120 Hz. square wave signal which is input to a first D-type flip-flop 44. The 5760 Hz. output from VCO 36 is used to synchronize the 120 Hz. produced by phase comparator 30 and a 120 Hz. square wave signal with a phase delay corresponding to a desired switch-on time is produced at the output of flip-flop 44. The same 120 Hz., as phase delayed, is input to shift register 46 which also produces a 120 Hz. pulse train, except that it is 60° out of phase with the pulse train produced by flip-flop 44. This is caused by the fact that 16 bits at 5760 Hz. is equivalent to 60°. As 5760 Hz. is ninety-six times as fast as 60 Hz., there must be ninety-six pulses for each 360° of a single 60 Hz. cycle. Therefore, each 180° interval can contain as many as forty-eight pulses, which translates into sixteen pulses being a 60° delay. Therefore, a 16 bit shift register which acts to delay the output by the timing of 16 bits on its clock input will delay its output by 60° at 60 Hz. Of course, the same operational effect can be achieved by utilizing some other multiple of sixty, as long as the shift register is chosen to have a bit delay corresponding to that same multiple divided by six.

Similarly, a second shift register 48 delays the 120 Hz. input by another 60°. Therefore, the outputs from flip-flop 44 and shift registers 46, 48 which are connected in cascade provide the phase delayed trigger signals as necessary to switch on the three windings of an A-C three-phase motor to achieve variable speed control.

Another flip-flop 49 produces 5760 Hz. pulses which have shorter duration (approximately 14 microseconds) and the AND gate 26 ensures that the phases are properly connected at the incoming transformer 22 to otherwise disable the circuit. These shortened pulses at 5760 Hz. are applied to three AND gates 50, 52, 54, such that the outputs thereof are 5760 Hz. pulses of shortened duration and phase delayed for speed control, and further phase offset by 60° to be in proper sequence for the three-phase motor. Trigger circuits 56, 58, 60 sense these incoming pulse trains and trigger power triacs 62, 64, 66 which are interconnected between the same three-phase A-C incoming line as is connected to transformer 22, and to the three windings 68, 70, 72 of a three-phase A-C small integral or fractional horsepower motor.

Figure 2:
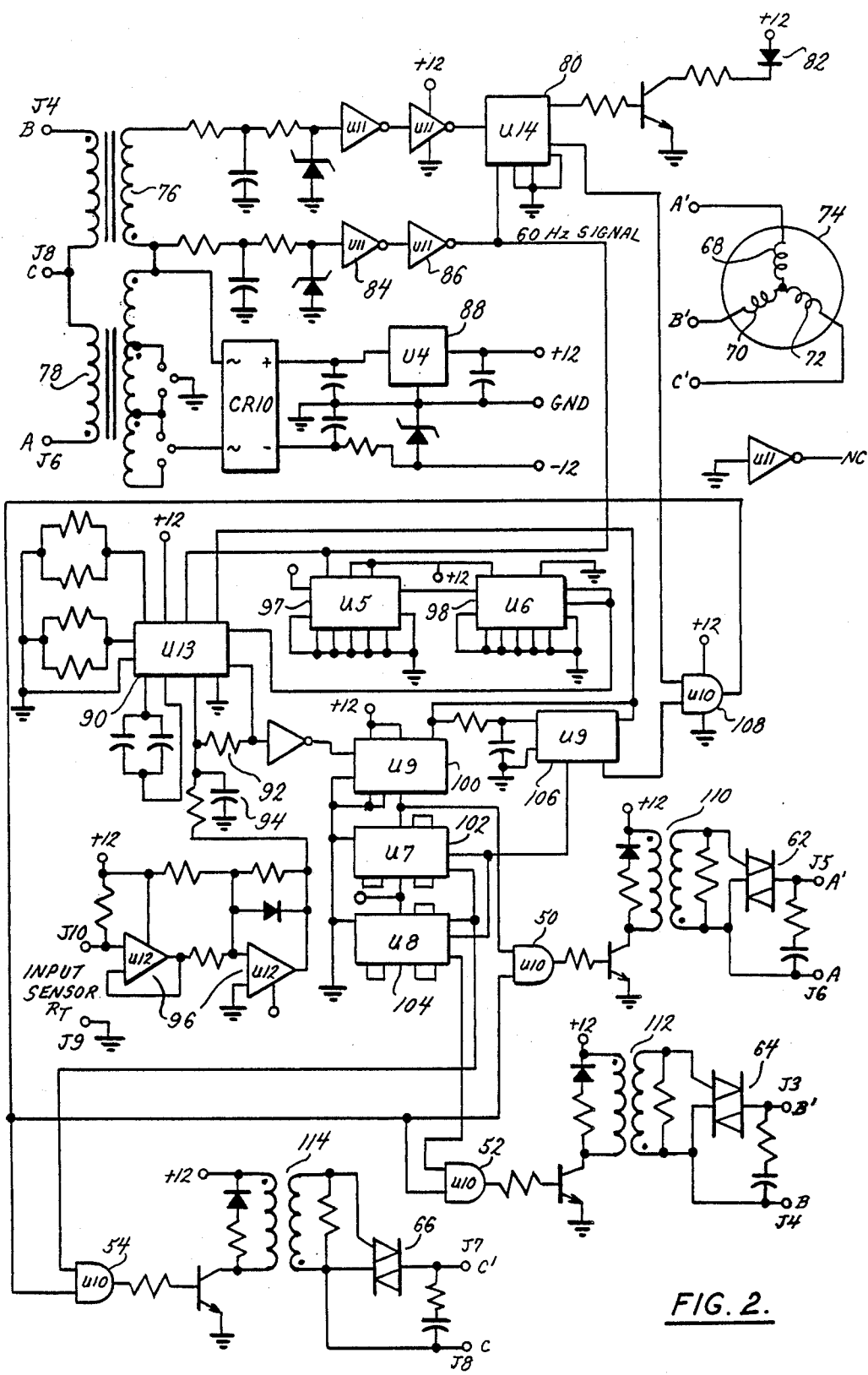
FIG. 2 is a detailed electronic schematic of the speed control of the present invention.

The foregoing has been a functional description of a block diagram which explains the operation of the present invention. A detailed circuit diagram is included in FIG. 2, and its principal components will be explained and identified to further enable one of ordinary skill in the art to make and use the invention.

Incoming transformer 22 includes transformers 76 and 78 which are connected as shown. The phase detection circuit 24 is comprised of the upper branch including chip U-14 which is labeled 80. In addition to providing an enable signal as shown in FIG. 1, an LED 82 is also illuminated to designate to the installer that the three-phase A-C has been connected improperly. The single phase reference 28 is produced through inverters U-11 and labeled 84, 86. The D-C power for logic is produced by U-4 labeled 88.

The heart of the phase locked loop 32 includes the phase comparator 30 and voltage controlled oscillator 36 which are included in chip U-13 and labeled 90. The low pass filter includes resistor 92 and capacitor 94. The control signal and amplifier 38 are input through U-12 and labeled 96. The divide-by-sixteen circuit 40 is performed by chip U-5 labeled 97, and the divide-by-six circuit 42 is performed by chip U-6 labeled 98. The first dual flip-flop 44 is U-9 as labeled 100, and shift registers 46, 48 are U-7 and U-8 labeled 102, 104, respectively. The second flip-flop 49 is chip U-9 and labeled 106 with AND gate 26 being chip U-10 labeled 108. AND gates 50, 52, 54 are chip numbers U-10, as shown. Trigger circuits 56, 58, 60 include transformers 110, 112, and 114, and their associated circuitry. Triacs 62, 64, 66 are shown and switch between terminals A, A1; B, B1; and C, C1. The three-phase motor 74 is shown with windings 68, 70, 72 with leads designated A1, B1, C1.

There are various changes and modifications which may be made to applicant's invention as would be apparent to those skilled in the art. However, these changes or modifications are included in the teaching of applicant's disclosure, and it is intended that the invention be limited only by the scope of the claims appended hereto.

What is claimed is:

1. A speed control for a three-phase A-C motor, said motor having three windings, said control comprising means for generating a trigger signal indicative of the phase delay desired in switching on a first winding corresponding to a desired speed, delay means to reproduce said trigger signal after a pre-determined time delay to switch on the second and third windings, the trigger signal generating means comprising a constant input frequency phase locked loop, said phase locked loop including a phase comparator, a constant frequency A-C reference source connected to a first input of said phase comparator, a voltage controlled oscillator connected to a second input of said phase comparator, and means to inject a control signal into said voltage controlled oscillator, said control signal being indicative of a desired speed, said voltage controlled oscillator having means to sense said control signal and alter the trigger signal in response thereto, the output of said phase comparator being representative of the trigger signal.

2. The device of claim 1 wherein the A-C reference source has a first frequency, and the voltage controlled oscillator means has a substantially higher frequency, and further comprising a divider means connected between said voltage controlled oscillator means and the phase comparator to match said two frequencies at the inputs of said phase comparator.

3. The device of claim 2 further comprising a first digital logic means having at least two inputs, the output of the phase comparator being connected to one of said inputs and the output of the voltage controlled oscillator means being connected to the other of said inputs.

4. The device of claim 3 further comprising a switching circuit means, said switching circuit means being adapted for connection to each of the windings of a three-phase A-C motor, said switching circuit means being connected to and controlled by the first digital logic means and the delay means.

5. The device of claim 4 wherein the delay means comprises at least two digital logic means connected in cascade with the first digital logic means.

6. The device of claim 5 wherein the control signal sensing means comprises a filter means connected between the phase comparator means output and the first digital logic means, and wherein the control signal injection means is connected to the filter means.

7. The device of claim 6 further comprising means to connect the control to a three-phase A-C supply voltage, and means to sense the connected phase rotation and disable the control if the connected phase rotation is incorrect.

8. A speed control for a three-phase A-C motor, said motor having three windings, said control comprising a input constant frequency phase locked loop including a phase comparator means having a pair of inputs, one of said inputs being adapted for connection to a 60 Hz. A-C source, a voltage controlled oscillator means for producing an output signal at 60 N Hz. where N is a positive integer, a divider means connected between the voltage controlled oscillator means and the phase comparator means, said divider means having means to divide the 60N Hz. signal by N, the phase comparator means having an output corresponding to the phase difference between the 60 Hz. A-C source and the divider means output, means to shift the phase of the divider means output comprising means to inject a control signal into the voltage controlled oscillator, a flip-flop means having a first input connected to the phase comparator means output and a second input connected to the voltage controlled oscillator output, the output of said flip-flop means being a pulse train with a phase delay corresponding to a desired switch on time for one of the motor windings, a first and second shift register means connected in cascade with the flip-flop means, said first and second shift register means each being N/6 bit shift registers so that each shift register means output is shifted 60° from its input, each shift register means output thereby being a pulse train with a phase delay corresponding to a desired switch on time for one of the other motor windings.

9. The device of claim 8 wherein the divider means output phase shift means comprises a low pass filter connected between the phase comparator means and the flip-flop means, and the control signal comprises a control voltage, said control voltage being input into said low pass filter to thereby alter the signal input to the flip-flop means, said control voltage being representative of the desired motor speed.

10. The device of claim 9 further comprising a switching circuit means having an input connected to each of the flip-flop means and the first and second shift register means, and a controlled output for connection between each motor winding and an associated phase of the three-phase A-C supply voltage.

11. The device of claim 10 further comprising means to connect said control to a three-phase A-C supply, means to detect the phase sequence of said connected A-C supply, and means to disable the control in response to the phase detection means.

12. The device of claim 11 wherein the control voltage injection means includes means to connect to a thermistor, and an amplifier means to generate a voltage corresponding to the resistance of the thermistor.

13. A speed control for a three-phase A-C motor, said motor being a squirrel cage motor and having three windings, each of said windings being adapted for connection to one of the phases of a three-phase A-C supply, said speed control including a input constant frequency phase locked loop, said phase locked loop including a phase comparator means having a pair of inputs, one of said inputs being adapted for connection to a 60 hz. A-C source, a filter means, a voltage controlled oscillator means for producing an output signal at 60 N Hz., where N is a positive integer, and a divider means connected between the voltage controlled oscillator means and the phase comparator means, said phase comparator means having means to generate a pulse train representative of a desired switch-on time for a first of the motor windings, means to inject a control signal into the voltage controlled oscillator to change the phase relationship between the voltage controlled oscillator output and the 60 Hz. A-C source to thereby change the phase delay of the phase comparator means output in a manner corresponding to a desired switch-on time for a first of the motor windings, and digital logic means connected to the phase locked loop to generate corresponding pulse trains for the other two of said motor windings in proper phase relationship to match the first pulse train phase delay.

14. A speed control for a three-phase A-C motor, said motor having three windings, said control comprising means for generating a trigger signal indicative of the phase delay desired in switching on the first winding corresponding to a desired speed, delay means to reproduce said trigger signal after a predetermined time delay to switch on the second and third windings, the trigger signal generating means comprising a constant input frequency phase locked loop, said phase locked loop including a phase comparator, a constant frequency A-C reference source connected to a first input of said phase comparator, said A-C reference source having a first frequency, a voltage controlled oscillator connected to a second input of said phase comparator, said voltage controlled oscillator having a substantially higher frequency than said A-C reference source, a divider means connected between the voltage controlled oscillator and the phase comparator to match said two frequencies at the inputs of said phase comparator, a first digital logic means comprising a D-type flip-flop having at least two inputs, the output of said flip-flop being a pulse train, the output of the phase comparator being connected to one of said digital logic means inputs and the output of the voltage controlled oscillator being connected to the other of said digital logic means inputs, a switching circuit means, said switching circuit means being adapted for connection to each of the windings of the three-phase A-C motor, said switching circuit means being connected to and controlled by the first digital logic means and the delay means, the delay means comprising at least two digital logic means connected in cascade with the first digital logic means, said two digital logic means comprising two shift registers, the output of each of said shift registers being a delayed version of said first pulse train, and further comprising a means connected to the voltage controlled oscillator to produce a second pulse train, said second pulse train having pulses of shorter duration than the first pulse train, the switching circuit means further comprising three AND gates, each AND gate having one of its inputs connected to the second pulse train producing means and the other of its inputs connected to one of the flip-flop or shift registers, the output of said AND gates being used to switch A-C power to the three motor windings, means to inject a control signal into said voltage controlled oscillator, said control signal being indicative of a desired speed, said voltage controlled oscillator having means to sense said control signal and alter the trigger signal in response thereto comprising a filter means connected between the phase comparator means output and the first digital logic means, the output of said phase comparator being representative of the trigger signal, said control signal injection means being connected to the filter means, means to connect the control to a three-phase A-C supply voltage, and means to sense the connected phase rotation and disable the control if the connected phase rotation is incorrect.

15. The device of claim 14 wherein the voltage controlled oscillator means operates at 5760 Hz., and wherein the shift registers are 16 bit type shift registers so that each shift register output is delayed 60° from its input.

16. The device of claim 14 wherein the filter means is a low pass filter.

17. The device of claim 16 wherein the control signal injection means includes, means to produce a control signal.

18. The device of claim 17 wherein the control signal producing means includes a thermistor, and means to produce a control signal from approximately 0 volts to +12 volts D-C.

19. The device of claim 18 wherein the divider means includes a means to divide the 5760 Hz. by ninety-six and produce a 60 Hz. signal.

20. The device of claim 19 wherein the switching circuit means includes three triacs, each of said triacs being adapted for connection between one winding of the motor and one phase of the three-phase A-C supply voltage, each of said AND gates being connected to an associated one of said triacs to control the switching thereof.

21. A speed control for a three-phase A-C motor, said motor being a squirrel cage motor and having three windings, each of said windings being adapted for connection to one of the phases of a three-phase A-C supply, said speed control including a constant input frequency phase locked loop, said phase locked loop including a phase comparator means having a pair of inputs, one of said inputs being adapted for connection to a 60 Hz. A-C source, said phase comparator means having means to generate a pulse train representative of a desired switch-on time for a first one of the motor windings, a filter means, a voltage controlled oscillator means for producing an output signal at 60 N Hz., where N is a positive integer, a divider means connected between the voltage controlled oscillator means and phase comparator means, means to inject a control signal into the voltage controlled oscillator to change the phase relationship between the voltage controlled oscillator output and the 60 Hz. A-C source to thereby change the phase delay of the phase comparator means output in a manner corresponding to a desired switch-on time for a first one of the motor windings, and digital logic means connected to the phase locked loop to generate corresponding pulse trains for the other two of said motor windings in proper phase relationship to match the first pulse train phase delay, said digital logic means including a first and second shift register means, each of said first and second shift register means being an N/6 bit shift register so that each shift register means output is shifted 60° from its input, each shift register means output thereby being a pulse train with a phase delay corresponding to a desired swith-on time for the second or third motor winding.

22. The device of claim 21 wherein the digital logic means further comprises a D-type flip-flop having its data input connected to the low pass filter and its clock input connected to the voltage controlled oscillator means, its output being connected to the first shift register means, and the second shift register means input being connected to the first shift register means output, the output of the D-type flip-flop being used as the pulse train to switch on the first winding and thereby synchronize the three pulse trains for proper phase relationship therebetween.

* * * * *